Patented Dec. 25, 1951

2,579,481

UNITED STATES PATENT OFFICE 2,579,481

ADHESIVE COMPOSITION

James E. Fenn, Baldwin, N. Y., assignor of one-tenth to Charles H. Brown, Princeton, N. J.

No Drawing. Application February 17, 1948, Serial No. 8,999

11 Claims. (Cl. 260—17.5)

This invention relates to a remoistening adhesive particularly suitable for gummed tape and gummed paper, and to the process of making the same.

As is known, gummed tape and gummed paper have a dried adhesive on one or both surfaces, which becomes tacky upon moistening with water. In my copending U. S. application Serial No. 754,765, filed June 14, 1947, now U. S. Patent 2,457,357 granted December 28, 1948, I have disclosed a novel type of adhesive material suitable for gummed tape and gummed paper, and a process of making this adhesive. Briefly, the adhesive disclosed in my patent 2,457,357 comprises lignone (which is the concentrated waste liquor of the sulfite process of pulp manufacture, consisting mainly of salts of ligno-sulfonic acids) treated with a small quantity (of the order of 1% to 2.25%) of phosphoric acid. The process involves adding the phosphoric acid to the lignone, agitating the mixture, heating the mixture with agitation to a temperature in the range of approximately 175° to 190° F., and cooling while stirring to room temperature. My patent, supra, also teaches that the acid-treated lignone can be blended with a small quantity of medium viscosity soluble grade polyvinyl-alcohol solution to provide a remoistening type of adhesive having certain highly desirable characteristics, and when used for liquid adhesive purposes can dispense with the polyvinyl alcohol.

When this adhesive composed of lignone treated with phosphoric acid is used with the customary relative amounts of plasticizers (such as glucose, glycerine, invert sugar, the glycols or small amounts of salts) normally used in the adhesive industry, the resulting adhesive product is particularly useful as a palletizing adhesive on paper or corrugated board for holding together loaded cartons, because the adhesive has the property of bonding the surfaces of the cartons to the extent where they do not slip or fall apart during loading, shipping and unloading operations and yet enables the cartons to be easily separated without undue tearing of the bonded surfaces in response to a sudden lifting force applied to the cartons. For other adhesive purposes where a strong and permanent bond is required, this acid-treated lignone adhesive may be used as a liquid adhesive in blends with other adhesive materials, such as starches, dextrines or resins, but the resulting product will be more expensive and costly to produce because these last materials are relatively expensive compared to the cheaper acid-treated lignone. Where the acid-treated lignone is blended with polyvinyl alcohol and used to replace the relatively expensive animal glues as a remoistening adhesive on gummed tape and gummed papers, it is desirable in the interest of economy to use the minimum quantity of polyvinyl alcohol necessary to achieve the desired results because of the relatively high cost of this polyvinyl alcohol.

I have found that the adhesive resulting from the blend of phosphoric acid-treated lignone and a small quantity of medium viscosity, soluble grade polyvinyl alcohol lacks the important characteristic of "quick-tack" over a relatively long time period present in animal glue adhesives. The term "quick-tack" as used in the gummed tape industry, refers to that property of the tape which causes the glue-film to become so tacky on moistening that it will adhere strongly to surfaces on which the tape is applied, resulting in the tape gripping the surface very tenaciously without slipping. This characteristic of "quick-tack" is somewhat independent of the so-called "permanent-tack" or adhesion which refers to the final bond of the gummed tape to the surface on which the tape is applied after the glue-film has dried. Some tapes may have a "quick-tack" property or characteristic but not a good permanent-tack property, as a result of which the gummed tape, after the glue-film has dried, loosens itself (pops off) from the surface on which it has been applied, especially if the surface is a springy carton.

The adhesive made from lignone treated with phosphoric acid and blended with polyvinyl-alcohol, when used on gummed tape without any plasticizer, will give a flexible film which can be handled in the customary manner throughout the normal operations of making and using gummed tape. With animal-glues it is necessary and customary to add some plasticizer to the glue in order to render the film flexible so that the glue does not break off the paper when the tape is made flexible by bending over a sharp corner. Plasticizers are also useful in keeping the tape from curling in a too dry or a too humid atmosphere, thus enabling the operator to feed the tape properly through the moistening machine. The customary plasticizers used by the gummed tape industry are glycerine, glucose, invert sugar, glycols like ethylene-, diethylene- etc.-glycol, and small amounts of salts like calcium chloride, sodium chloride, sodium nitrate etc., and urea or thiourea. These plasticizers are used in the gummed tape industry in quantities not exceeding 5% based on the dry weight of the glue, because larger quantities will make the tape too susceptible to moisture in the atmosphere and cause highly undesirable "blocking" of the tape, in which the adhesive adheres to the ungummed back of the tape when it is rolled up. The reason for this blocking is that glue is quite hygroscopic and will absorb up to 15% moisture from the atmosphere. Plasticizers are more hygroscopic than glue and will absorb much larger quantities of moisture from the atmosphere, thus making the glue-film so tacky that it will adhere to the backing of the tape when wound in rolls (the form in which tape is made and used). To prevent this "blocking," the normal amount of plasticizers used in gummed tape is 3% or even lower.

Another reason for using small quantities of plasticizers in the gummed tape industry is the fact that larger quantities will make the tape "slow"; i. e., have less "quick-tack." A slow tape requires a longer time to develop the extreme adhesiveness necessary in fast operations. When a "slow" tape is used for sealing cartons, the operator must keep on smoothing the tape with his hands until enough of the water has been absorbed by the carton surface to develop the necessary tackiness; as a result of which the operation of sealing cartons proceeds at a slow rate. This is especially noticeable when the tape is used on fast, automatic machines like those which make the cartons from corrugated board. In this operation involving automatic machines, "quick-tack" is of paramount importance because the quicker the tape tacks, the faster the machines can be run and the greater the quantity of cartons which can be produced on the same machine working with the same operator during the same number of working hours.

I have discovered that larger quantities of plasticizers will impart a greater degree of "quick-tack" to the phosphoric acid-treated lignone-polyvinyl alcohol adhesive when used for gummed tape or gummed paper. This is entirely unexpected from the action of plasticizers on gummed tape and gummed paper using animal glue, where larger quantities of plasticizers produce just the opposite effect. If merely glycerine and the like plasticizers are used in my acid treated lignone-polyvinyl alcohol adhesive in amounts of 10% and more, the adhesive coated tape will possess the very desirable "quick-tack" property but will have the drawback of becoming too hygroscopic and exhibiting a very marked tendency to "block"; i. e., adhere to the backing of the wound-up tape to the point where the roll will become solid, and cannot be unwound. This undesirable effect occurs quickly, for example overnight when the tape is left in the dispensing machine which contains water, or in a few hours in the summer if the tape is exposed by taking it out from its moistureproof wrapper. According to one important aspect of the present invention, this "blocking" is prevented by using urea or thiourea as the main plasticizer in the acid treated lignone-polyvinyl alcohol blend of adhesive. This use of urea or thiourea causes the tape to remain in its original condition so that it can be unwound freely. The quantity of urea or thiourea which has been found to be effective in the practice of the invention may be as large as 20%, based on the dry weight of the adhesive comprising about 5% to 10% medium viscosity soluble grade polyvinyl-alcohol and 90% to 95% of acid treated lignone, although 15% of the urea or thiourea will produce the most desirable results. Thus, the acid treated lignone with the polyvinyl alcohol will compose approximately 80% of the finished adhesive while the urea or thiourea plasticizer will compose 20% of the finished adhesive, both calculated on the dry basis. The quantity of urea or thiourea used in the practice of the invention will be surprisingly large to anyone skilled in the gummed tape and adhesive industry because 20% of urea will render animal-glue liquid (i. e., if it is dissolved with this quantity of urea, it will remain liquid indefinitely after it cools down instead of becoming a stiff jell). Urea and glycerine or glycol, or invert sugar can be used to good advantage in the adhesive of the invention in the proportions of 10% to 15% of urea or thiourea to 10% to 5% of the glycerine, glycol, or invert sugar. Part of the urea may be replaced by any one or a combination of salts customarily used in the gummed tape industry. A combination of urea or thiourea, and salts and glycerine, glycol or glucose or invert sugar can be used in the practice of the invention, however, to obtain the desired results of "quick-tack" and "non-blocking" characteristics, provided that the amount of urea or thiourea is at least of the order of 10%, preferably 15% based on the dry weight of the acid-treated lignone and polyvinyl alcohol blend.

One example of the steps followed in producing the acid-treated lignone and polyvinyl alcohol adhesive of the invention is given below:

500 pounds of lignone containing 250 pounds of solids is placed in a steam jacketed kettle equipped with an agitator. The agitator is started and 2½ pounds of phosphoric acid (100% concentration) is slowly added to the agitated lignone. After all the acid has been added to the lignone, steam is supplied to the jacket until the temperature of the solution reaches 185° F. The steam is then turned off and cold water is supplied to the jacket until the solution (still being agitated) cools to about 90° F. (approximately room temperature). After the solution has cooled to 90° F., there is added slowly 70.1 pounds of urea or thiourea, and the solution agitated until all of the urea or thiourea is dissolved. Then 234 pounds of polyvinyl alcohol solution containing 12% solid polyvinyl alcohol (corresponding to 28.1 pounds of dry polyvinyl alcohol) is added to the acid treated lignone and urea (or thiourea) and agitation continued until the resulting solution is homogeneous, which may take about ten or fifteen minutes. The resulting adhesive solution will therefore include:

250.0 lbs. solid lignone
2.5 lbs. solid phosphoric acid
28.1 lbs. solid polyvinyl alcohol (PVA)

280.6 lbs. composed of 10% PVA and 90% of acid treated lignone
70.1 lbs. dry urea or thiourea 350.7 lbs. composed of 20% urea or thiourea and 80% of lignone, acid and PVA.

I have furthermore discovered that a slight quantity of a compound which when mixed in water releases sulfur dioxide or sulfurous acid, like sodium bisulfite, zinc hydrosulfite or sulfur dioxide gas exerts a beneficial effect on the resulting acid-treated lignone adhesive when used on gummed tape. This slight quantity of compound (which has a slight bleaching effect not entering into consideration in the practice of the present invention) is preferably applied to the lignone during that step in the process of manufacture when the phosphoric acid is added to the lignone and before the material is heated and ready to be blended with polyvinyl alcohol. The quantity of bleach used is not sufficient to produce a pronounced bleaching effect; for example 1% of zinc hydrosulfite based on the dry weight of the lignone or similar quantities of other bleaching materials of the foregoing type will have the tendency to keep my adhesive coated tape "alive" for longer periods of time. In other words, the tape will retain all its good qualities for months, whereas if none of these bleaching materials is used, the tape will slowly lose its "quick-tack" over a shorter period of time. This bleach may be used with the acid-treated lignone and polyvinyl alcohol adhesive with excellent results whether or not urea or thiourea is employed in the adhesive. This small amount of bleach may also be used with my acid treated lignone adhesive when blended with starches, dextrines or resins. Reference is made to my copending application Serial No. 9,000 filed February 17, 1948, for a more detailed description of this bleach compound for use in my adhesive composition.

It is understood by those skilled in the chemical art that the chemical formula of lignone (the concentrated waste liquor of the sulfite pulp process) is unknown. It is for this reason that I cannot advance any theory to account for the highly desirable but unexpected results obtained by the use of the urea and thiourea plasticizers or the bleach on this acid-treated lignone material, in accordance with the teachings of the invention. The results, however, are unexpected and contrary to what might be expected by those using these plasticizers and bleachers in the gummed tape industry in which animal glue adhesives are employed.

What is claimed is:

1. An adhesive comprising the concentrated waste liquor of the sulfite-pulp process treated with a small quantity of phosphoric acid and then blended with polyvinyl alcohol and urea, said urea being in the amount of substantially 10% to 20% based on the dry weight of the polyvinyl alcohol and acid-treated material, said urea being in an amount greater than the polyvinyl alcohol.

2. An adhesive comprising the concentrated waste liquor of the sulfite-pulp process treated with a small quantity of phosphoric acid and then blended with polyvinyl alcohol and thiourea, said thiourea being in the amount of substantially 10% to 20% based on the dry weight of the polyvinyl alcohol and acid-treated material, said thiourea being in an amount greater than the polyvinyl alcohol.

3. A remoistening adhesive suitable for use on gummed tape and gummed paper, comprising the concentrated waste liquor of the sulfite-pulp process composed of salts of ligno-sulfonic acids treated with a small amount of phosphoric acid and then blended with polyvinyl alcohol and urea, said urea being in the amount of substantially 10% to 20% based on the dry weight of the polyvinyl alcohol and acid-treated material, said urea being in an amount greater than the polyvinyl alcohol.

4. A remoistening adhesive suitable for use on gummed tape and gummed paper, comprising the concentrated waste liquor of the sulfite-pulp process composed of salts of ligno-sulfonic acids treated with a small amount of phosphoric acid and then blended with polyvinyl alcohol and thiourea, said thiourea being in the amount of substantially 10% to 20% based on the dry weight of the polyvinyl alcohol and acid-treated material, said thiourea being in an amount greater than the polyvinyl alcohol.

5. A remoistening adhesive comprising the concentrated waste liquor of the sulfite-pulp process treated with substantially 1% of phosphoric acid, and then blended with polyvinyl alcohol and a plasticizer, selected from the group which consists of urea and thiourea, said plasticizer being in the amount of substantially 15% based on the dry weight of the polyvinyl alcomol and acid-treated material said plasticizer being in an amount greater than said polyvinyl alcohol.

6. A remoistening adhesive comprising the concentrated waste product of the sulfite-pulp process treated with substantially 1% of phosphoric acid, and then blended with polyvinyl alcohol and a plasticizer selected from the group which consists of urea and thiourea, said plasticizer being in the amount of substantially 10% to 20% based on the dry weight of the polyvinyl alcohol and acid-treated material, which in turn are in the relative amounts of substantially 5% to 10% polyvinyl alcohol and substantially 90% 95% acid-treated material.

7. A remoistening adhesive comprising the concentrated waste product of the sulfite-pulp process treated with substantially 1% of phosphoric acid and a substance of the type which when mixed with water releases sulfur dioxide, and then blended with polyvinyl alcohol and a plasticizer selected from the group consisting of urea and thiourea, said plasticizer being in the amount of substantially 10% to 20% based on the dry weight of the polyvinyl alcohol and acid-treated material, which in turn are in the relative amounts of substantially 5% to 10% polyvinyl alcohol and substantially 90% to 95% acid-treated material.

8. A gummed article comprising a backing and an adhesive coating formed of a composition whose major ingredient is the concentrated waste liquor of the sulfite pulp process treated with a small quantity of phosphoric acid, said acid-heated liquor being blended with polyvinyl alcohol and urea, said urea being in an amount greater than said polyvinyl alcohol.

9. A gummed article comprising a backing and an adhesive coating formed of a composition whose major ingredient is the concentrated waste liquor of the sulfite pulp process treated with a small quantity of phosphoric acid, said acid-treated liquor being blended with polyvinyl alcohol and thiourea, said thiourea being in an amount greater than said polyvinyl alcohol.

10. An adhesive comprising the concentrated waste liquor of the sulfite-pulp process treated with a small quantity of phosphoric acid, and then blended with polyvinyl alcohol and with a plasticizer selected from the group consisting of urea and thiourea, said plasticizer being in the amount of substantially 10% to 20% based on the dry weight of all those materials in the adhesive other than said plasticizer.

11. A remoistening adhesive comprising as a major ingredient the concentrated waste product of the sulfite-pulp process treated with approximately 1% to 2.25% of phosphoric acid, and then blended with polyvinyl alcohol and a plasticizer selected from the group which consists of urea and thiourea, said plasticizer being in the amount of substantially 10% to 20% based on the dry weight of the polyvinyl alcohol and acid-treated material, said plasticizer being in an amount greater than said polyvinyl alcohol.

JAMES E. FENN.

REFERENCES CITED

The following references are of record in the file of this patent:

UNITED STATES PATENTS

| Number | Name | Date |
| --- | --- | --- |
| 2,148,893 | Bauer | Feb. 28, 1939 |
| 2,162,618 | Izard | June 13, 1939 |
| 2,340,866 | Dangelmajer | Feb. 8, 1944 |
| 2,385,586 | Rudy | Sept. 25, 1945 |
| 2,443,889 | Bruce | June 22, 1948 |
| 2,457,357 | Fenn | Dec. 28, 1948 |